United States Patent Office 2,942,186
Patented June 21, 1960

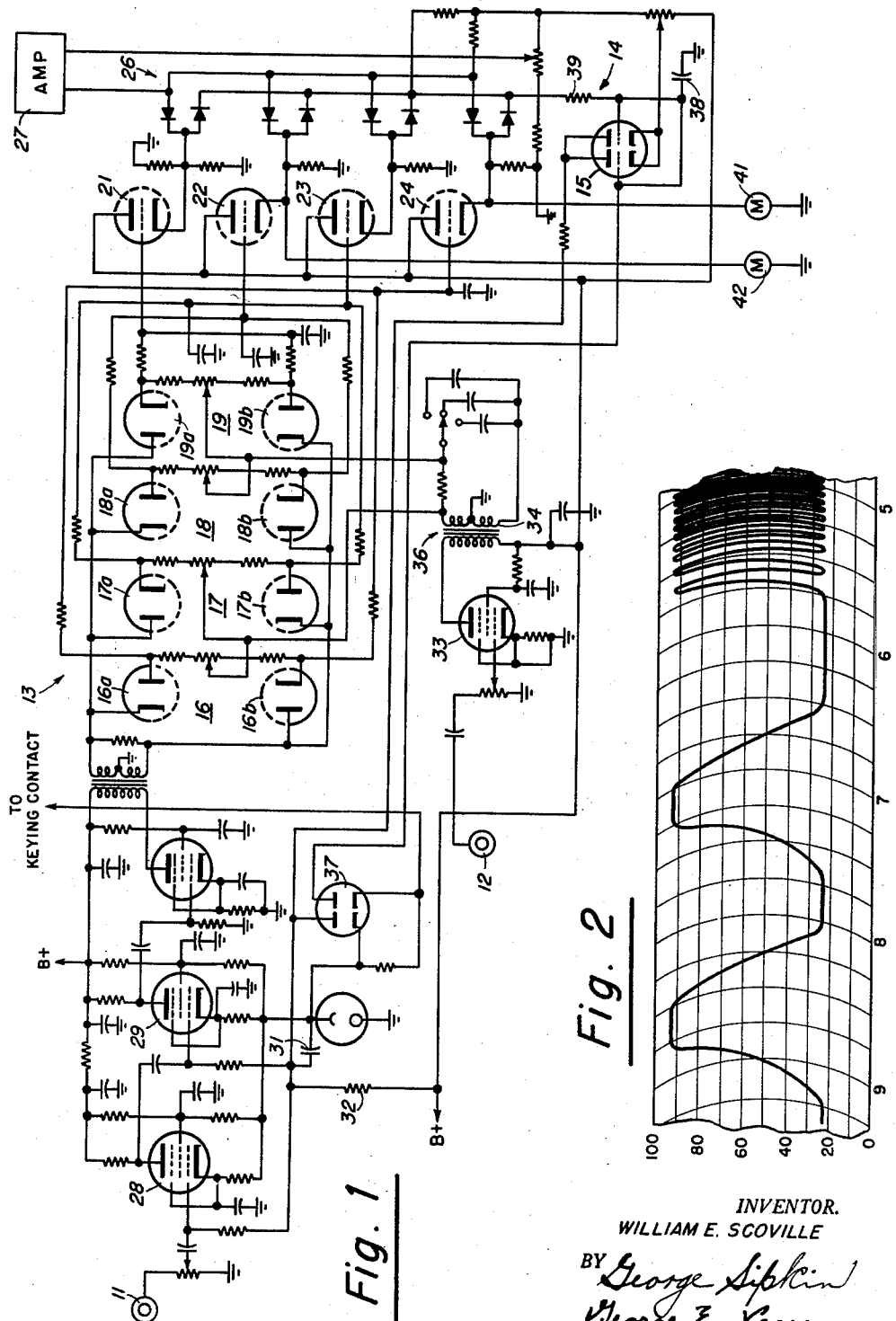

2,942,186

APPARATUS FOR DETECTING PHASE SHIFT

William E. Scoville, 3557 48th Loop, Sandia Base, Albuquerque, N. Mex.

Filed July 28, 1955, Ser. No. 525,089

1 Claim. (Cl. 324—87)

(Granted under Title 35, U.S. Code (1952), sec. 266)

The invention described herein may be manufactured and used by or for the Government of the United of America for governmental purposes without the payment of any royalties thereon or therefor.

This invention pertains to a method and apparatus for measuring radio propagation variations and more particularly to a system for comparing and measuring variations in phase of a received signal from a remote transmitter with respect to the local reference signal at the receiver to evaluate the stability of a propagation medium in order to determine the practical overall accuracy in the determination of a navigational "fix." The method and apparatus of this invention provides an instrumental determination of propagational variations that will be encountered in such a radio navigational system.

Heretofore, in developing a radio navigational system in which a navigator's position is determined by a phase comparison of received signals from two or more stations located at known sites, and whose transmitted signals bear a certain phase relationship to one another at the transmitters, the stability of the propagation medium had not been evaluated in order to determine the practical overall accuracy in the determination of the navigational "fix." However, with this invention this possible cause of inaccuracy or error can be considered and correctional changes made in navigational charts and tables.

It is therefore an object of this invention to provide a method and apparatus for measuring radio propagation variations.

A further object is the provision of apparatus for measuring variations in phase of a received signal from a remote transmitter with respect to the local reference signal at the receiver.

A further object is the provision of apparatus for comparing the phase of a transmitted signal with a reference signal to evaluate the stability of the transmitted signal propagation medium.

Another object is the provision of apparatus for determining the anticipated diurnal change of transmission time between two fixed points.

Other objects and many of the attendant advantages of this invention will be readily appreciated as the same becomes better understood by reference to the following detailed description when considered in connection with the accompanying drawings wherein:

Fig. 1 shows a schematic of the circuit; and

Fig. 2 shows a sample recording which shows the effect of phase drift.

This invention employs a phase stable signal transmitted from a remote point and received at the remote signal input 11 and a phase stable reference signal located at the receiving site and received at the reference signal input 12. The phase detector generally designated as 13 is for the purpose of measuring the variations in phase of the received signal with respect to the phase of the reference signal. These variations in phase of the received signal are due to variations in the propagation medium. The output of the phase detector 13 is a minus D.-C. voltage whose average value is a function of the phase difference of the two signals applied to the input. For 90° or 270° phase displacement between the two signals the output voltage is zero; for zero degrees and 180° the output voltage is a maximum.

In order to have an output of constant polarity and amplitude, an automatic gain control 14 and four phase detectors 16, 17, 18, and 19 in 90° phase relationship are provided. These phase detectors are necessary since the arriving signal might be of any phase. These detectors include dual diodes 16a and 16b, 17a and 17b, 18a and 18b, 19a and 19b having four D.-C. outputs connected to the grids of the four cathode followers 21, 22, 23, 24, which are used to avoid loading of the phase detectors. The outputs of the cathode followers are applied to eight (two sets of four) germanium diodes 26 arranged as gates as shown in Fig. 1. One set of diodes selects the most positive going cathode of the cathode followers and applies the signal to the grid of tube 15 in the automatic gain control 14. The other set of four diodes selects the most negative going cathode and applies the signal to the input of the amplifier circuit 27. The output of the tube 15 is fed back to the grids of the signal amplifiers 28, 29 preceeding the phase detector 13 through an appropriate time constant provided by capacitor 31 and resistor 32.

The local reference signal is amplified at 33 and applied to transformer 34 whose output is connected to a phase shift network 36 which produces two signals of 90° phase shift. These two signals are applied to the appropriate phase detectors to produce the four outputs which are at 90° phase relationship.

This phase comparison system in which phase variations due to the propagation media are measured, is not used when the frequency of the remote signal is time shared with a strong local transmitter. However, with the use of double diode 37 this apparatus may be thus used in time sharing and other systems to prevent the automatic gain control 14 from being actuated by the strong local signal so as not to obscure the weaker remote signal. This diode 37 acts as a control tube which disables the automatic gain control tube 15 when the local signal is being received at 11, and is switched in and out by an appropriate commutator segment in accordance with the local transmission time. This is more fully described in my co-pending application, Serial No. 526,337, filed August 3, 1955, for An Improved Commutator Synchronizer, now Patent No. 2,819,398. The other half of control tube 37 serves as a clamp tube to prevent grids of tubes 28, 29 from going positive in the absence of signal. Since the automatic gain control tube 15 is controlled through a time constant determined by condenser 38 and the resistor 39 in the D.-C. output of the phase detector, it is not actuated by noise and only operates when a signal coherent with the local reference is received.

By off-setting the frequency of the local reference by a few parts per billion, i.e., 20 parts in $10^9$, there is a constant rate of variation in phase between the two input signals if the arrival phase of the remote signal is unaffected by variations in the propagation medium. The variations in phase between the received and reference signals are recorded on the chart of recorder 41 which is connected at the output of the cathode follower 24. Since it is posible that a reversal of drift could take place near zero degrees or 180° phase that could not be detected on a single meter, another recording meter 42 is connected to the cathode of follower 22 so that when one meter reads zero the other reads a plus or minus maximum. Thus there are no points of ambiguity.

Referring now to the sample record in Fig. 2, which was made as the reference signal was varied in frequency, it will be noted that the distance between excursions is increasing as the paper moves past the pen from left to right. The phase shift shown at the left is ⅔ cycle per hour. In the same manner changes in propagation will produce the same variations in rate. Under some conditions these variations can be readily detected visually while in others they can be accurately measured only with a pair of dividers.

The method of measuring the variations in phase due to variations in the propagational medium involves the following steps:

(a) Transmit a phase stable signal from a remote point.

(b) Generate a phase stable reference at the same frequency at the receiving site.

(c) Compare the received and reference signals in a manner to produce a D.-C. signal with an amplitude indicative of the phase relation therebetween.

(d) Adjust reference signal frequency until there is a frequency difference in the order of 20 parts per billion such that the D.-C. signal varies in amplitude at this rate as long as the propagation medium remains constant.

(e) Recording the D.-C. signal to produce a record trace of any D.-C. amplitude rate variations.

(f) Measuring propagation changes in terms of changes in rate of the amplitude variation of the D.-C. signal observed on the chart.

As one modification, the output of the phase detector could be chopped and applied to a servo system which continuously corrects the phase of the local reference signal. A recording of these corrections would also be a recording of the propagation medium variation.

Obviously many modifications and variations of the present invention are possible in the light of the above teachings. It is therefore to be understood that within the scope of the appended claim the invention may be practiced otherwise than as specifically described.

What is claimed is:

Apparatus for detecting phase shift in a substantially constant-frequency continuous-wave signal comprising four parallel-connected circuits, each circuit including two diodes connected in the same direction to opposite ends of a pair of parallel-connected resistance means, two circuits being connected for conduction in one direction and the other two circuits being connected for conduction in the opposite direction, one of the resistance means in each of the circuits having an output terminal at its center, means having a portion at a reference potential for converting said continuous-wave signal into two identical signals that are both symmetrical about said reference potential and for applying said two identical signals 180 degrees out of phase with each other to the ends of said parallel-converted circuits, and means for applying two 90 degrees out of phase continuous wave reference signals of substantially identical frequency as said first-mentioned signal and symmetrical with respect to said reference potential to the centers of the other resistance means, one of the reference signals going to one pair of oppositely conductive circuits and the other of the reference signals going to the remaining pair of oppositely conductive circuits, whereby in each circuit when the reference signal applied thereto is 90 degrees out of phase with the two 180 degrees out-of-phase signals the direct current voltage at the respective output terminal relative to said reference potential is zero and when the reference signal applied thereto is in phase with one of the two 180 degrees out-of-phase signals the direct current voltage at the respective output terminal relative to said reference potential is maximum whereby phase variation between the reference signal and said first-mentioned signal causes variation in the direct current voltage levels at said output terminals between zero and their maxima, and means for continuously selecting the largest direct current voltage output voltage on the four terminals.

References Cited in the file of this patent

UNITED STATES PATENTS

| | | |
|---|---|---|
| 2,481,912 | Dorsman et al. | Sept. 13, 1949 |
| 2,561,182 | Crane | July 17, 1951 |
| 2,568,250 | O'Brien | Sept. 18, 1951 |
| 2,588,094 | Eaton | Mar. 4, 1952 |
| 2,672,588 | Vanous | Mar. 16, 1954 |
| 2,677,101 | Boune | Apr. 27, 1954 |
| 2,718,546 | Schlesinger | Sept. 20, 1955 |
| 2,725,528 | Werner | Nov. 29, 1955 |
| 2,746,013 | Mertz | May 15, 1956 |